United States Patent
Jonsson et al.

(10) Patent No.: US 6,404,656 B1
(45) Date of Patent: Jun. 11, 2002

(54) CONTROL EQUIPMENT FOR THYRISTOR-CONTROLLED SERIES CAPACITOR EQUIPMENT, AND A METHOD FOR CONTROL THEREOF

(75) Inventors: Tomas Jonsson, Vasteras; Lennart Angquist, Enkoping, both of (SE)

(73) Assignee: ABB AB, Vasteras (SE)

(*) Notice: Subject to any disclaimer, the term of this patent is extended or adjusted under 35 U.S.C. 154(b) by 0 days.

(21) Appl. No.: 09/831,882

(22) PCT Filed: Aug. 31, 2000

(86) PCT No.: PCT/SE00/01671
§ 371 (c)(1),
(2), (4) Date: Jul. 11, 2001

(87) PCT Pub. No.: WO01/24342
PCT Pub. Date: Apr. 5, 2001

(30) Foreign Application Priority Data

Sep. 22, 1999 (SE) .............................................. 9903401

(51) Int. Cl.[7] .......................... H02H 7/12; H02M 5/458; H02M 7/515
(52) U.S. Cl. ........................... 363/57; 363/96; 363/135; 363/37
(58) Field of Search ............................ 363/36, 37, 57, 363/95, 96, 135

(56) References Cited

U.S. PATENT DOCUMENTS

| | | | |
|---|---|---|---|
| 4,028,607 A | * 6/1977 | Watanabe | 363/51 |
| 4,039,866 A | * 8/1977 | Komuro et al. | 327/477 |
| 4,340,823 A | * 7/1982 | Miyazawa | 307/66 |
| 4,866,592 A | * 9/1989 | Fujii et al. | 363/98 |
| 5,804,949 A |   9/1998 | Othman et al. | |

FOREIGN PATENT DOCUMENTS

| | | |
|---|---|---|
| EP | 0 707 368 | 4/1996 |
| WO | WO 94/24752 | 10/1994 |
| WO | WO 96/15573 | 5/1996 |

* cited by examiner

Primary Examiner—Bao Q. Vu
(74) Attorney, Agent, or Firm—Oblon, Spivak, McClelland, Maier & Neustadt, P.C.

(57) ABSTRACT

Thyristor-controlled series capacitor equipment (CEQ), intended for connection between an ac network (NET) and a converter (CONV), connected thereto, for conversion between alternating current ((IT) and high-voltage direct current (Id), with a controllable semiconductor valve (TYSW), has control equipment with control means (32) which, in dependence on a synchronization signal ($\Phi_{SYNC}$), form firing pulses (TP1,TP2) for control of the semiconductor valve. The converter has a control device (CTR1) which forms a control-angle order ($\alpha$-ORD) for phase-angle control of the converter, related to the phase position for a voltage ($U_{12}$) at a chosen connection point (J2). The control equipment (CTREQ) comprises phase-correcting means (52, S4) which form the synchronization signal in dependence on a voltage-phase signal ($\Phi_U$)) supplied thereto and containing information about the phase position of said voltage, and on a control-angle signal ($\alpha$) supplied thereto and containing information about the control angle of the converter.

13 Claims, 6 Drawing Sheets

CONTROL EQUIPMENT FOR THYRISTOR-CONTROLLED SERIES CAPACITOR EQUIPMENT, AND A METHOD FOR CONTROL THEREOF

TECHNICAL FIELD

The present invention relates to control equipment for thyristor-controlled series-capacitor equipment, which is intended for connection between an ac network and a converter, connected thereto, for conversion between alternating voltage and high-voltage direct current, and to a method for control of such series-capacitor equipment.

BACKGROUND ART

It is known to series-compensate converters of the kind described above by connecting the valve bridges of the converter to the ac network via series capacitors. This entails several advantages. The series capacitors are charged periodically by the current traversing them, and the voltages which are thereby generated across the capacitors constitute additions to the commutating voltages across the valves of the converter. The commutating voltages are phase-shifted related to the voltages of the ac network such that, with the control and extinction angles of the converter related to the voltages of the ac network, the valves during rectifier operation may be controlled with control angles smaller than zero and in inverter operation with extinction angles smaller than zero. In this way, as viewed from the ac network, a reduction of the consumption of reactive power by the converter is achieved, and by suitable dimensioning of the capacitors, the dependence of the overlap angle on the magnitude of the direct current may be compensated. This means that the series compensation contributes to maintain the margin of commutation of the valves also in case of rapid current transients.

FIG. 1 illustrates such a known configuration. The figure will be described in greater detail below with reference to the description of embodiments of the invention.

I Woodford & Zheng, "Series Compensation of DC Links". Power electronics in electric power systems—Symposium; International conference on large high voltage electric systems, Cigre, Tokyo May 1995, a configuration is described where the series capacitor is connected between the ac network and the converter in such a way that the ac filters belonging to the converter are placed between the transformer of the converter and the series capacitor equipment. The document refers to previous investigations in which ferroresonance, that is, oscillations in the subsynchronous frequency range between the series capacitor and the magnetic circuit of the converter transformer and at which the latter becomes saturated, is identified as a problem in similar configurations. The document states temporary connection of an inductor in parallel with the series capacitor to be an efficient method for damping such oscillations. Further, it is suggested that the series capacitor, essentially for economic reasons, be divided into a plurality of series-connected sections, which may each in a known way be bypassed or connected. FIG. 2A illustrates schematically, in the form of a single-line diagram, one such known configuration. The series capacitor comprises a number of sections C1, C2, C3, each one being connected in parallel with a fixed inductor, L11, L12, L13, respectively, and an inductor, L21, L22, L23, respectively, which may be temporarily connected by means of a switching member S21, S22, S23, respectively. Switching members S11, S12, S13 make possible connection and disconnection of individual sections. The document further mentions, in general terms, that additional damping is possible by controlling the current through the parallel-connected inductor by means of a thyristor switch comprising two thyristors in anti-parallel connection.

U.S. Pat. No. 5,032,738 (Vithayathil, J. H.) describes, in particular in FIG. 3A of the patent, a device connected in a transmission line and comprising a series capacitor connected in parallel with an inductor. The current through the inductor is controlled by a thyristor switch connected in series with the inductor and comprising two thyristors in anti-parallel connection. The purpose of the device is stated to be to achieve fast and continuous changes of the transmission impedance of the transmission line and to facilitate damping of subsynchronous oscillations as well as to modulate the current in the transmission line.

A device of this kind is usually referred to as a thyristor-controlled series capacitor, or a TCSC, and is schematically illustrated in the form of a single-line diagram in FIG. 2B. A capacitor C is connected in parallel with an inductor L and a controllable semiconductor valve TYSW, the last-mentioned components being mutually series-connected. The semiconductor valve comprises two thyristors, TY1 and TY2, respectively, in anti-parallel connection. The semiconductor is supplied with firing pulses TP1, TP2 which bring the respective thyristors to the conducting state at firing instants determined by control equipment (not shown).

The published European patent application EP 0 689 272 A1, which is hereby included as a reference, describes control members for controlling the firing instants for the semiconductor valve in a TCSC. The control members comprise a command signal-generating member, preferably a phase-locked loop synchronized to the current through the transmission line, which phase-locked loop delivers equidistant command signals which are substantially independent of subsynchronous components and which are used as reference times for initiation of firing pulses for the semiconductor valve. A calculating circuit is adapted, based on these reference times in dependence on the instantaneous values of the line current and the capacitor voltage, to determine the firing instants in such a way that the instants for the zero crossings of the capacitor voltage occur with a constant time delay relative to the reference times. The zero crossings thus become substantially equidistant also in the presence of subsynchronous components in the current through the transmission line. The method comprises damping or completely preventing subsynchronous resonant oscillations, independently of a superordinate control of the effective impedance of the series capacitor at the fundamental frequency.

The firing instants for the semiconductor valve must be synchronized with respect to either the voltage across or the current through the capacitor. This is done conventionally by bringing a phase-locked loop to generate a signal related to the phase position for the fundamental tone of one of these quantities.

Studies in this respect have shown that synchronization to the current through the capacitor provides better dynamic properties for the thyristor-controlled series capacitor.

FIGS. 3 and 4, which will be described in greater detail below with reference to the description of embodiments of the invention, schematically illustrate, respectively, known control, equipment for a TCSC and typical signal shapes in such control equipment.

A phase-locked loop usually comprises a low-pass filter which limits its bandwidth, that is, its ability to rapidly reproduce a change in the phase position of the current. Typically, this bandwidth is in the interval of 10–40 Hz.

Thyristor-controlled series capacitor equipment, which is connected between an ac network and a converter connected to the ac network, is subjected to rapid transients in the phase position of the current, in particular during operational disturbances such as, for example, when the converter temporarily loses its load and thereafter resumes it. Such a situation may, for example, arise when the converter is blocked in connection with a line fault and then, when the fault has been cleared, resumes operation as soon as possible. In that context, a situation may arise whereby the phase-locked loop does not provide the correct information about the present phase position of the current, which leads to the semiconductor valve being fired at unsuitable firing instants, resulting in large and possibly harmful valve currents.

SUMMARY OF THE INVENTION

The object of the invention is to provide control equipment of the kind described in the introductory part of the description, which is improved with respect to its ability for synchronization with the phase position of the current through the series capacitor equipment, in particular when this phase position undergoes rapid changes, and a method for control of the series capacitor equipment.

The dynamic performance of the thyristor-controlled series capacitor depends to a great extent on whether reliable and rapid information about the phase position of the applied current is available. Such information is available at the earliest in the control device of the converter as a measure of the control angle thereof.

A control device forms a control-angle order for phase-angle control of the converter, related to the phase position for a voltage at a chosen connection point, and the object of the invention is achieved in that the control equipment, which comprises control means which in dependence on a synchronization signal forms firing pulses for control of the semiconductor valve, comprises phase-correcting means forming the synchronization signal in dependence on a voltage-phase signal applied thereto, which contains information about the phase position for the voltage in question, and on a control-angle signal supplied thereto, which contains information about the control angle of the converter.

According to a further development of the invention, the control equipment forms the synchronization signal in dependence also on a dc signal supplied thereto, which contains information about the amplitude for a sensed direct current through the converter.

According to another further development of the invention, the control means form the firing pulses for control of the semiconductor valve in dependence on an ac signal, containing information about the instantaneous amplitude of a sensed alternating current flowing through the series capacitor equipment, and on the ac voltage signal, containing information about the instantaneous amplitude for a sensed ac voltage across the series capacitor equipment.

According to yet another further development of the invention, in which the control equipment comprises a controller for control of the fundamental-tone reactance of the series capacitor equipment in dependence on a difference of a reference value for the fundamental-tone reactance and an actual value thereof, supplied to the controller, the control equipment comprises reference-value forming means which form the reference value in dependence on a dc signal supplied to the control equipment and containing information about the amplitude for a sensed direct current through the converter.

BRIEF DESCRIPTION OF THE DRAWINGS

The invention will be described in greater detail in the following by description of embodiments with reference to the accompanying drawings, which are all schematic and, with the exception of FIGS. 4 and 6, in the form of single-line diagrams and block diagrams, respectively, and wherein.

DESCRIPTION OF THE PREFERRED EMBODIMENTS

The following description relates both to the control equipment and to the method for control of the series capacitor equipment.

The control equipment comprises calculating members, in the figures shown in the form of block diagrams, and it is to be understood that the input and output signals to the respective blocks may consist of signals or calculated values. The terms signal value and calculated value will therefore be used synonymously in the following.

In order not to burden the description with distinctions which are self-explanatory to the person skilled in the art, generally the same designations are used for the currents and voltages which occur in the installation as are used for the measured values and signal/calculated values, corresponding to these quantities, which are applied and processed in the control equipment which will be described in the following.

The block diagrams show measured values and blocks for forming certain calculated values which are used in other shown blocks—connecting lines between these measured values and these blocks have in certain cases been omitted in order not to burden the drawings, but it is to be understood that the respective calculated values are obtained from the blocks in which they are formed and that measured values are formed in some way known per se by sensing corresponding quantities in the installation which comprises series capacitor equipment and converters.

Further, it is to be understood that although the blocks shown in the figures are referred to as units, members, filters etc, these are to be understood as means for achieving the desired function, especially in the event that their functions are implemented as software in, for example, microprocessors.

Figure 1:
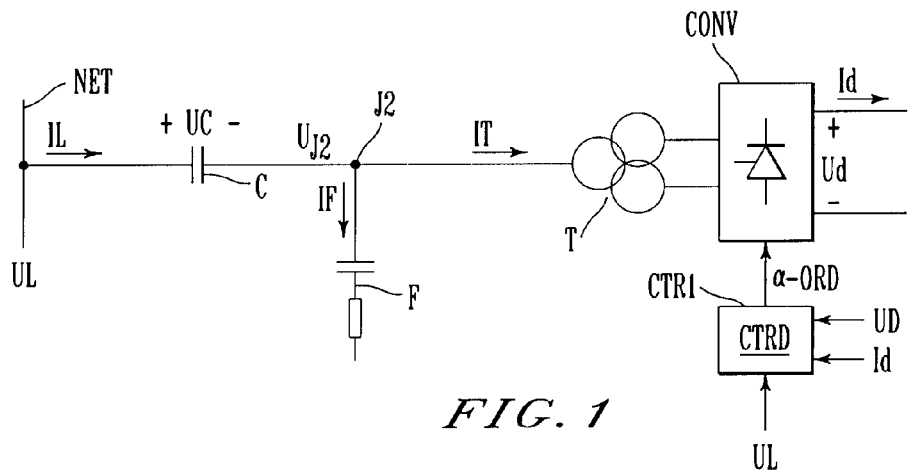
FIG. 1 shows a known embodiment of a series-compensated converter for conversion between alternating current and high-voltage direct current.
Figure 2A:
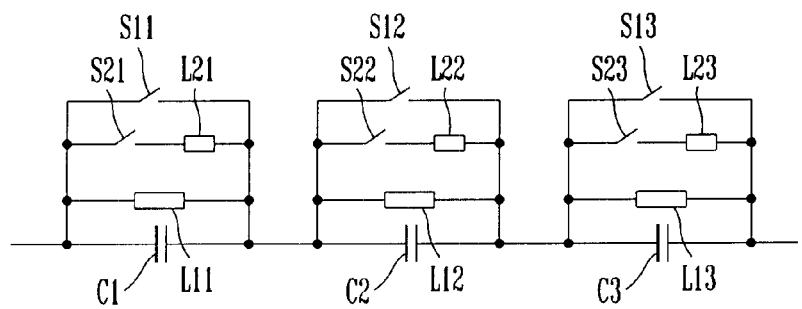
FIG. 2A shows a known embodiment of a series capacitor according to FIG. 1.
Figure 2B:
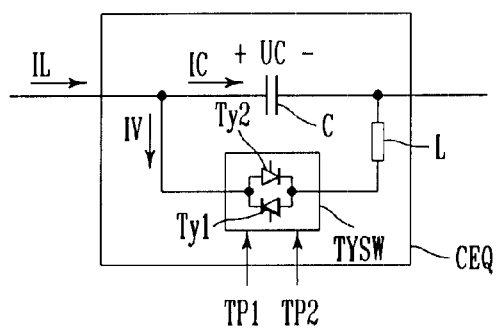
FIG. 2B shows a known embodiment of a thyristor-controlled series capacitor

FIG. 1 illustrates, in the form of a single-line diagram, a known configuration of a series-compensated converter. A thyristor converter CONV is connected, via a converter transformer T and a series capacitor C, to a three-phase ac network NET, shown in the figure only as a voltage busbar UL. The converter transformer has a Y-connected and a Δ-connected secondary winding, each one being connected to a respective one of two series-connected line-commutated six-pulse valve bridges, comprised in the converter but not shown in the figure. The converter has a dc voltage Ud and delivers to a dc circuit (not shown), which may comprise a converter of the same kind, a direct current Id. A control device CTRL forms, in some manner known per se, in dependence on the dc voltage and the direct current, a control-angle order α-ORD, related to the voltage UL, which control-angle order is supplied to the valves of the converter for phase-angle control thereof. An alternating current IT flows to the converter. A shunt filter F for filtering harmonics in the alternating current is connected to a connection point J2 located on the primary side of the converter transformer, that is, between the converter transformer and the series capacitor. The voltage at the connection point J2 is designated $U_{J2}$ and the current IF flows through the filter. The current IL through the series capacitor thus consists of the sum of the currents IF and IT. The voltage across the series capacitor is designated UC.

Figure 3:
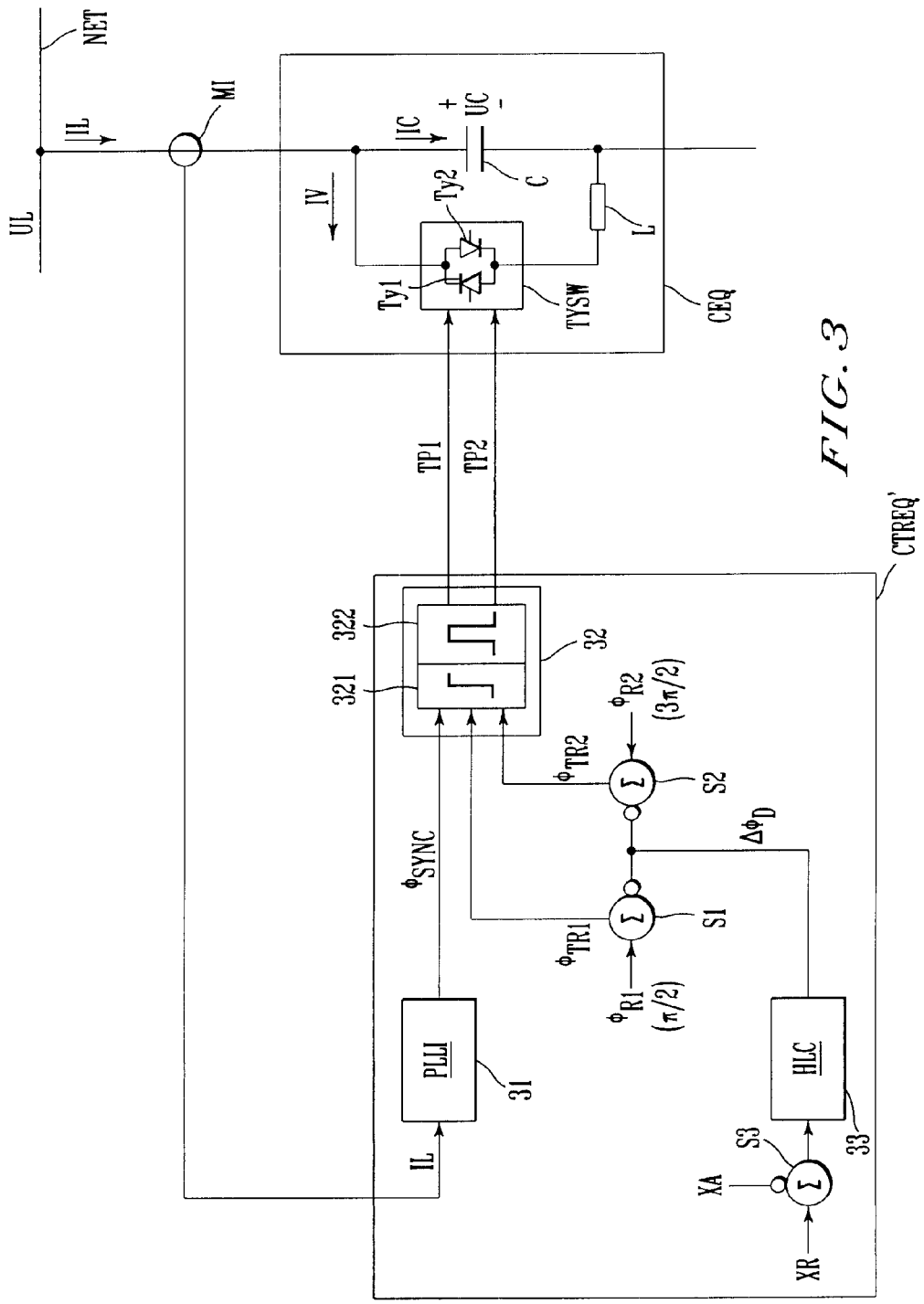
FIG. 3 shows a known embodiment of control equipment for a thyristor-controlled series capacitor according to FIG. 2B.

FIG. 3 illustrates, in the form of a block diagram, a known embodiment of control equipment for thyristor-controlled series capacitor equipment CEQ. The series capacitor equipment comprises a capacitor C, connected in parallel with an inductor L and a controllable semiconductor valve TYSW. The inductor and the semiconductor valve are mutually series-connected. The semiconductor valve comprises two thyristors, TY1 and TY2, respectively, in antiparallel connection. The semiconductor valve is supplied with firing pulses TP1 and TP2, which bring the thyristor TY and the thyristor TY2, respectively, into the conducting state at firing instants determined by control equipment CTREQ'. The series capacitor equipment is connected to a three-phase ac network NET, in the figure only shown as a voltage busbar with the voltage UL. The network has a fundamental frequency, usually 50 or 60 Hz, to which an angular frequency ω and a cycle time T correspond. A current IL flows from the ac network to the series capacitor equipment and is sensed with a current measuring device MI. The current through the inductor L is designated IV. The conducting direction for the thyristor TY2 coincides with the reference direction for the current IL, chosen in the figure. The measured value of the current is supplied to a phase-locked circuit 31 comprised in the control equipment. This circuit forms a synchronization signal $\Phi_{SYNC}$, which is saw-tooth shaped such that, under stationary conditions during a period T corresponding to 2π electric radians of the current, it grows linearly from the value zero to a value 2π, whereupon it returns to the value zero. The value zero thereby coincides, in steady state, with the positive zero crossing of the current, In FIG. 4 the horizontal axis is graduated in the electrical angle of the current IL, and the vertical axis shows the current IL, expressed in per units, as well as the synchronization signal $\Phi_{SYNC}$. The figure illustrates the above-described relationship between the current IL and the synchronization signal $\Phi_{SYNC}$.

Figure 4:
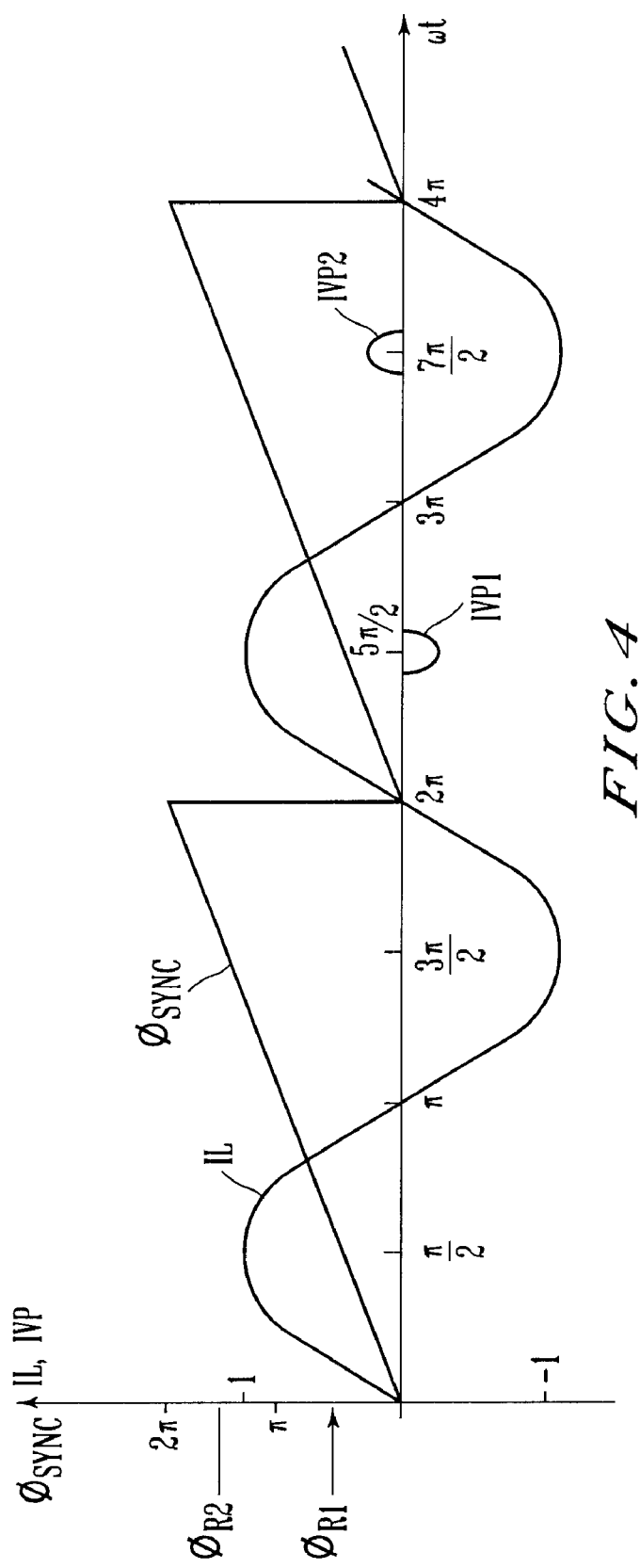
FIG. 4 shows, in the form of a diagram, curve shapes in control equipment according to FIG. 3.

The synchronization signal and a first trigger signal $\Phi_{TR1}$ and a second trigger signal $\Phi_{TR2}$ are supplied to a trigger unit 32, comprising a comparing member 321 and a pulse-generating member 322. The trigger unit forms a first firing pulse TP1 when the value of the synchronization pulse corresponds to the value of the first trigger signal and a second firing pulse TP2 when the value of the synchronization signal corresponds to the value of the second trigger signal, whereby the firing pulse TP1 brings the thyristor TY1 into the conducting state and the firing pulse TP2 brings the thyristor TY2 into the conducting state. A summing member S1 is supplied with a first reference signal $\Phi_{R1}$ and a deviation signal $\Delta\Phi_D$, which will be explained in greater detail below, and forms as output signal the trigger signal $\Phi_{TR1}$ as the difference of the reference and deviation signals (a circle at a signal input at the summing member denotes that this signal input is a negating input). A summing member S2 is supplied with a second reference signal $\Phi_{R2}$ and the deviation signal $\Delta\Phi_D$. The first reference signal is given the value $\Phi_{R1}=\pi/2$ and the second reference signal is given the value $\Phi_{R2}=3\pi/2$. If the deviation signal has the value zero, this means that, with chosen reference directions, the firing pulse TP1 will be formed when the fundamental tone for the current IL has its maximum positive value whereas the firing pulse TP2 will be formed when this fundamental tone has its maximum negative value. Since the capacitor voltage at these times is, in principle, equal to zero, the valve current IV will therefore be, in principle, equal to zero. This is illustrated in FIG. 4 in the sub-interval {0, 2π} of the first horizontal axis.

A summing member S3 is supplied with and forms the difference of a reference value XR of a quantity X and the actual value XA of this quantity. The difference is supplied to a superordinate controller 33 which, in dependence thereon, forms the deviation signal $\Delta\Phi_D$. The quantity X is related to the series capacitor equipment and may typically consist of the fundamental-tone reactance thereof, which fundamental-tone reactance, in some manner known per se, is determined based on sensed values of the line current and the voltage across the capacitor. In the event that the current value of the quantity X falls below the reference value, the trigger signals will thus assume the values $\Phi_{TR1}=\pi/2-\Delta\Phi_D$ and $\Phi_{TR2}=3\pi/2 -\Delta\Phi_D$, respectively, and the firing pulses TP1, TP2 will hence be formed at instants in time when the capacitor voltage may generate a valve current IV, which will have the shape of current pulses IVP1, IVP2, respectively, in principle symmetrical about the positive and negative maximum values, respectively, of the line current. This is illustrated in FIG. 4 in the second sub-interval {2,π4π} of the horizontal axis.

Figure 5:
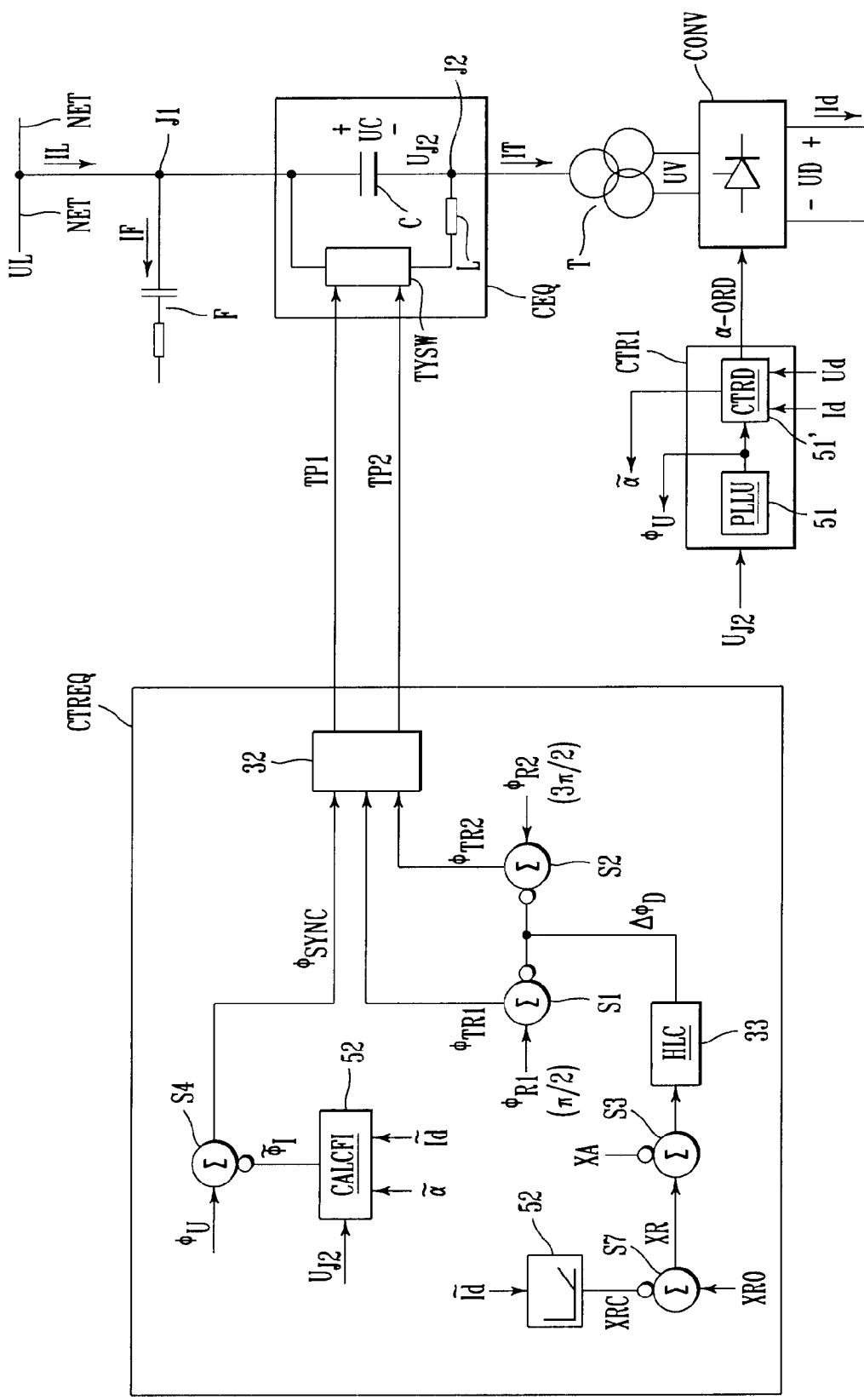
FIG. 5 shows an embodiment according to the invention of control equipment for a thyristor-controlled series capacitor according to FIG. 2B.

FIG. 5 shows, in the form of a block diagram, a preferred embodiment of the invention. The figure shows thyristor-controlled series capacitor equipment CEQ of the kind described with reference to FIG. 3, a shunt filter F, a converter transformer T and a thyristor converter CONV of the kind described with reference to FIG. 1, as well as control equipment CTREQ according to the invention. In the configuration shown in FIG. 5, the shunt filter, contrary to the one shown in FIG. 1, is not connected to the connection point J2 but to a connection point J1 located between the ac network and the series capacitor equipment. The alternating current through the series capacitor equipment is therefore, in this configuration, the same as the alternating current IT flowing via the converter transformer to the converter.

Signals, units and members shown in FIG. 5 with the same designations as signals, units and members shown in FIGS. 1 and 3 are of the same kind and have the same function as described with reference to the latter figures.

The control device CTR1 of the converter forms, in a conventional way, a converter synchronization signal which is synchronized to the phase position for a voltage chosen in the ac circuit and sensed there, and a control-angle order α-ORD with a phase delay α in relation to this converter synchronization signal. The valves of the converter are brought into the conducting state in dependence on the control-angle order and the alternating current through the converter therefore becomes phase-shifted by an angle α relative to the voltage sensed in the ac circuit.

For the purpose of illustrating the invention, it is assumed for the time being that the voltage chosen for the above-mentioned synchronization is the voltage $U_{J2}$ at the connection point J2, and a method for forming such a converter synchronization signal is shown in FIG. 5.

A measured value $U_{J2}$, sensed in some manner known per se by means of a voltage measuring device (not shown), is supplied to a phase-locked circuit 51, which for the sake of the example is shown as included in the control device CTR1 of the converter.

The phase-locked circuit forms a voltage-phase signal $\Phi_U$, which is saw-tooth shaped in a manner similar to that of the synchronization signal described with reference to FIG. 3, but with the difference that its value zero is locked to the positive zero crossing of the voltage $U_{J2}$.

The control-angle order is formed in dependence on the voltage-phase signal in that part of the control device which is designated 51' in the figure.

Figure 6:
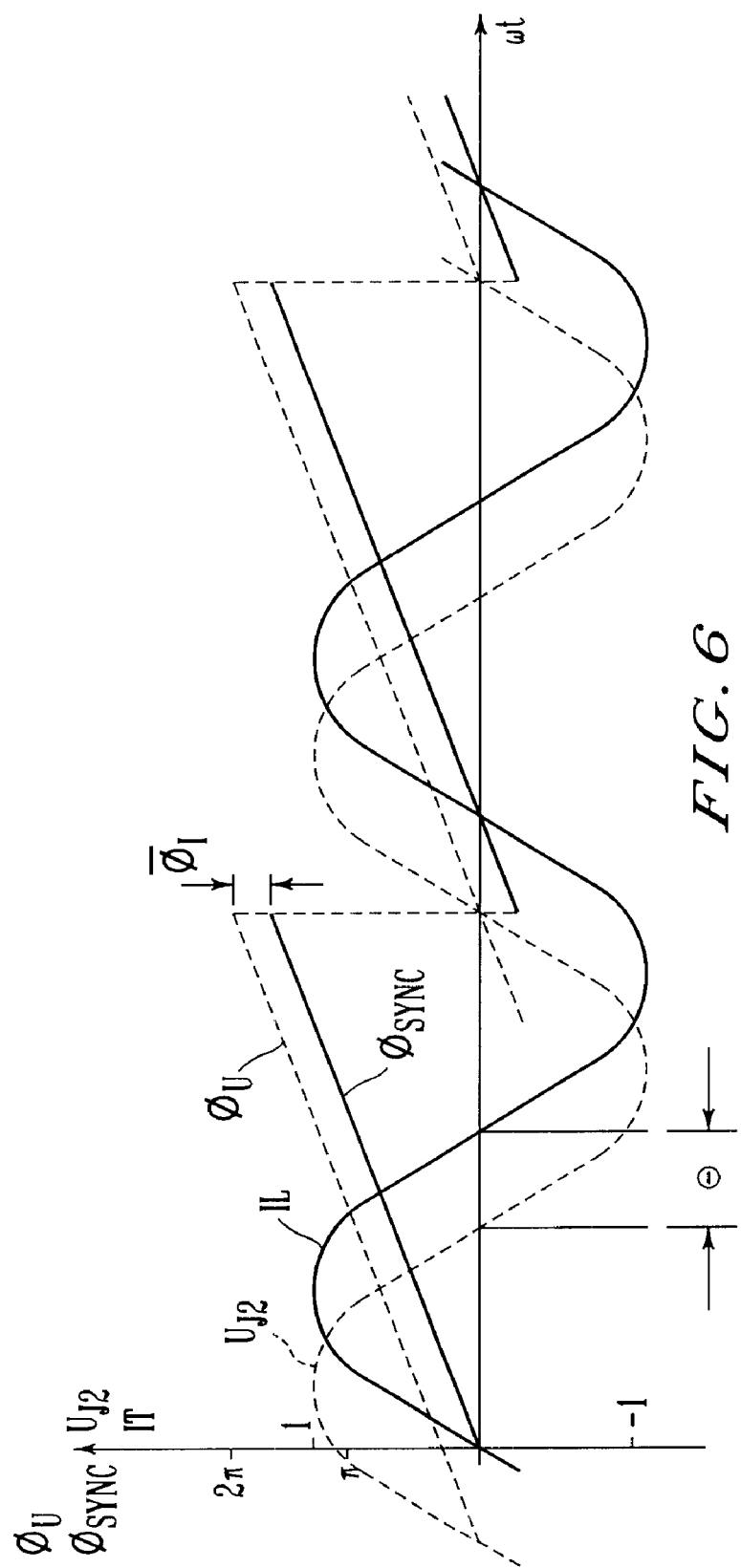
FIG. 6 shows, in the form of a diagram, curve shapes in control equipment according to FIG. 5.

In FIG. 6 the horizontal axis is graduated in the elecrical angle of the current IT and the vertical axis shows the voltage $U_{J2}$ and the current IT, expressed in per units, as well as the voltage-phase signal $\Phi_U$ and the synchronization signal $\Phi_{SYNC}$ for the series capacitor equipment, which according to the invention is formed in a manner which will be described in greater detail below.

FIG. 6 illustrates a relationship where the current IT has a phase position an electrical angle θ after the phase position of the voltage $U_{J2}$ and illustrates the above-described relationships between the voltage $U_{J2}$, the current IT, the voltage-phase signal $\Phi_U$ (dashed line) and the synchronization signal $\Phi_{SYNC}$ (continuous line).

The voltage-phase signal $\Phi_U$ shown in FIG. 6 is thus an example of a signal for synchronization of the control-angle order α-ORD with the phase position for the voltage at the connection point J2.

The task according to the invention is to synchronize the firing instants for the thyristors comprised in the semiconductor valve TYSW to the current through the series capacitor equipment and thereby avoid the above-mentioned limitations exhibited by a phase-locked circuit with regard to its ability to rapidly reproduce a change in the phase position of the current. What is to be aimed at is thus that the synchronization signal $\Phi_{SYNC}$ should be related in phase to the current IT through the series capacitor equipment as described above with reference to FIGS. 3 and 4 and also as illustrated in FIG. 6 described in the following.

The phase position for the alternating current in a network comprising a line-commutated converter is dependent, besides on the other components connected to this network, on the operating conditions of the converter, especially its control angle and its overlap angle. The latter angle is dependent on the direct current flowing through the converter and can be determined in a known manner when the line voltage and the commutating impedance are known. Thus, for example, a change of the control angle α for the converter has a direct and immediate influence on the phase position of the alternating current.

According to the invention, on the basis of the operating conditions of the converter, a current phase signal $\Phi_I$ is now created which is an at least approximate measure of the phase position of the current through the series capacitor equipment.

For the current IT which flows through the converter and the series capacitor equipment, the following expression, in a complex representation, is approximately valid $$IT = \frac{2\sqrt{6}}{\pi} \frac{UV}{UT_N} I_d e^{-j(\alpha+\mu/2)} \quad (1)$$

where UV is the voltage of the Y-connected and Δ-connected secondary windings, respectively, of the transformer T, corresponding to the nominal primary voltage $UT_N$ of the transformer (that is, in this embodiment the nominal voltage at the connection point J2), and the actual ratio of the transformer taking into consideration the occurrence of a tap-changer, α the control angle of the converter, $I_d$ the direct current through the converter and μ its overlap angle. The quantity α is related to the voltage at the connection point J2.

From expression (1) it is realized that if the voltage-phase signal $\Phi_U$ is delayed in time by an angle corresponding to the argument for the expression of the current IT, a saw-tooth shaped signal is obtained, the positive zero crossings of which are synchronized with the current IT, that is, a signal which constitutes the desired synchronization signal $\Phi_{SYNC}$ for the series capacitor equipment.

In the control device CTR1 of the converter, signals corresponding to the control angle α are available in conventional manner, and the overlap angle may be calculated, at least approximately, in a manner known per se, with knowledge of sensed values of the voltage of the ac network, the control angle and the direct current Id. A calculating member 52 comprised in the control equipment CTREQ is supplied with a control-angle signal α, formed in the control device of the converter and containing information about the instantaneous value of the control angle, and, in this embodiment, sensed values of the voltage $U_{J2}$ of the ac network and a dc signal $\tilde{I}_d$ containing information about the amplitude of the direct current Id. The calculating member is adapted, in some manner known per se, to calculate the overlap angle μ and to form the current-phase signal $\Phi_I$ in dependence on the phase for the current IT according to the expression (1), that is, the current-phase signal is, in this embodiment, dependent on the control and overlap angles, $\Phi_I=\Phi_I(\alpha, \mu)$, where thus, in this example, $\Phi_I=\alpha+\mu/2$.

A summing member S4 is supplied with and forms as output signal the difference of the voltage-phase signal $\Phi_U$ and the current-phase signal $\Phi_I$, which difference thus constitutes the desired synchronization signal $\Phi_{SYNC}$ for the series capacitor equipment. Otherwise, the control equipment CTREQ operates as described with reference to FIG. 3 in dependence on the reference signal $\Phi_{R1}$ and $\Phi_{R2}$ as well as the deviation signal $\Delta\Phi_D$.

In FIG. 6, the phase position for the current IT is marked as an angle θ between the voltage $U_{J2}$ and the current IT.

For various reasons, it may be suitable to relate the voltage-phase signal to some other connection point in the ac circuit, for example to the voltage UL for the ac network, that is, in a configuration according to FIG. 5, the voltage at the connection point J1, located between the ac network and the series capacitor equipment. The converter synchronization signal of the converter is then of course synchronized to the phase position for the voltage at the connection point J1, whereby also its control-angle order α-ORD and the information about the control angle, available in the control device of the converter, become related to this voltage.

For a configuration of a shunt filter, a converter transformer and a thyristor-converter according to FIG. 1, where the shunt filter is connected to the connection point J2 between the series capacitor equipment and the converter transformer, the following is valid for the current IL through the series capacitor equipment $$IL = IT + IF \quad (2)$$

where IT is the alternating current to the converter and IF the current through the shunt filter.

Still, if synchronization of the control-angle order α-ORD takes place to the phase position for the voltage at the connection point J2, the expression (2) may be written as $$IL = \frac{2\sqrt{6}}{\pi} \frac{UV}{UT_N} I_d e^{-j(\alpha+\mu/2)} + j \frac{Q_{FN}}{UT_N^2} \left| \frac{U_{J2}}{\sqrt{3}} \right| \quad (3)$$

where UV is the voltage of, respectively, the Y-connected and Δ-connected secondary windings of the transformer T, corresponding to the nominal primary voltage $UT_N$ of the transformer, and the actual ratio of the transformer taking into consideration the occurrence of a tap-changer, $UT_N$ the nominal voltage for the primary side of the transformer (the RMS value of the principal voltage), $U_{J2}$ the nominal voltage at the connection point J2, α the control angle of the converter, $I_d$ the direct current through the converter, μ its overlap angle, and $Q_{FN}$ is the nominal reactive power of the filter at the fundamental frequency.

The phase position for the current IL flowing through the series capacitor relative to the voltage at the connection point J2 may thus be determined from expression (3) as follows $$\arg \left\{ \frac{2\sqrt{6}}{\pi} \frac{UV}{UT_N} I_d e^{-j(\alpha+\mu/2)} + j \frac{Q_{FN}}{UT_N^2} \left| \frac{U_{J2}}{\sqrt{3}} \right| \right\} \quad (4)$$

where arg designates the argument for the complex expression (4).

The current-phase signal $\Phi_I$, which in this application of the invention thus consists of an electrical angle corresponding to the expression (4), is thus dependent on actual values of the voltage at the connection point J2, the direct current through the converter, as well as the control and overlap angles, $\Phi_I = \Phi_I(\alpha, \mu, I_d, U_{J2})$. The quantities UV, $UT_N$ and $Q_{FN}$ are known from the calculated data of the installation.

In another embodiment of the invention, the influence of the overlap angle on the phase angle between current and voltage is omitted, whereby the current-phase signal $\Phi_I$ is formed according to expressions (1) and (4) above but with the value zero assigned to the overlap angle μ, whereby, for example according to expression (1), the current-phase-signal is dependent only on the control angle, $\Phi_I = \Phi_I(\alpha)$.

Studies have shown that in certain cases, at high currents, especially during temporary operation with overcurrents, the voltage generated by the series capacitor equipment enforces an undesired oversizing of the converter with respect to voltage. As illustrated in FIG. 5, which exemplifies an embodiment where the superordinate controller 33 is a controller for the fundamental-tone reactance X of the series capacitor equipment, according to a further development of the invention, the reference value XR for the fundamental-tone reactance X of the series capacitor equipment may be reduced by a correction value XRC, formed in dependence on the direct current Id through the converter. A dc signal $\tilde{I}_d$, containing information about the amplitude for the direct current through the converter, is supplied to a function-forming member 53, which forms the correction value XRC when the direct current exceeds a predetermined value. Typically, this predetermined value may correspond to the nominal value of the direct current for the installation and the correction value XRC is formed in such a way that it grows linearly with the direct current across this predetermined value. The correction value and a base reference value XRO are supplied to a summing member S7, which as output signal forms the difference XR of the base reference value and the correction value, XR=XRO−XRC, which difference constitutes the reference value for the controller.

Figure 7:
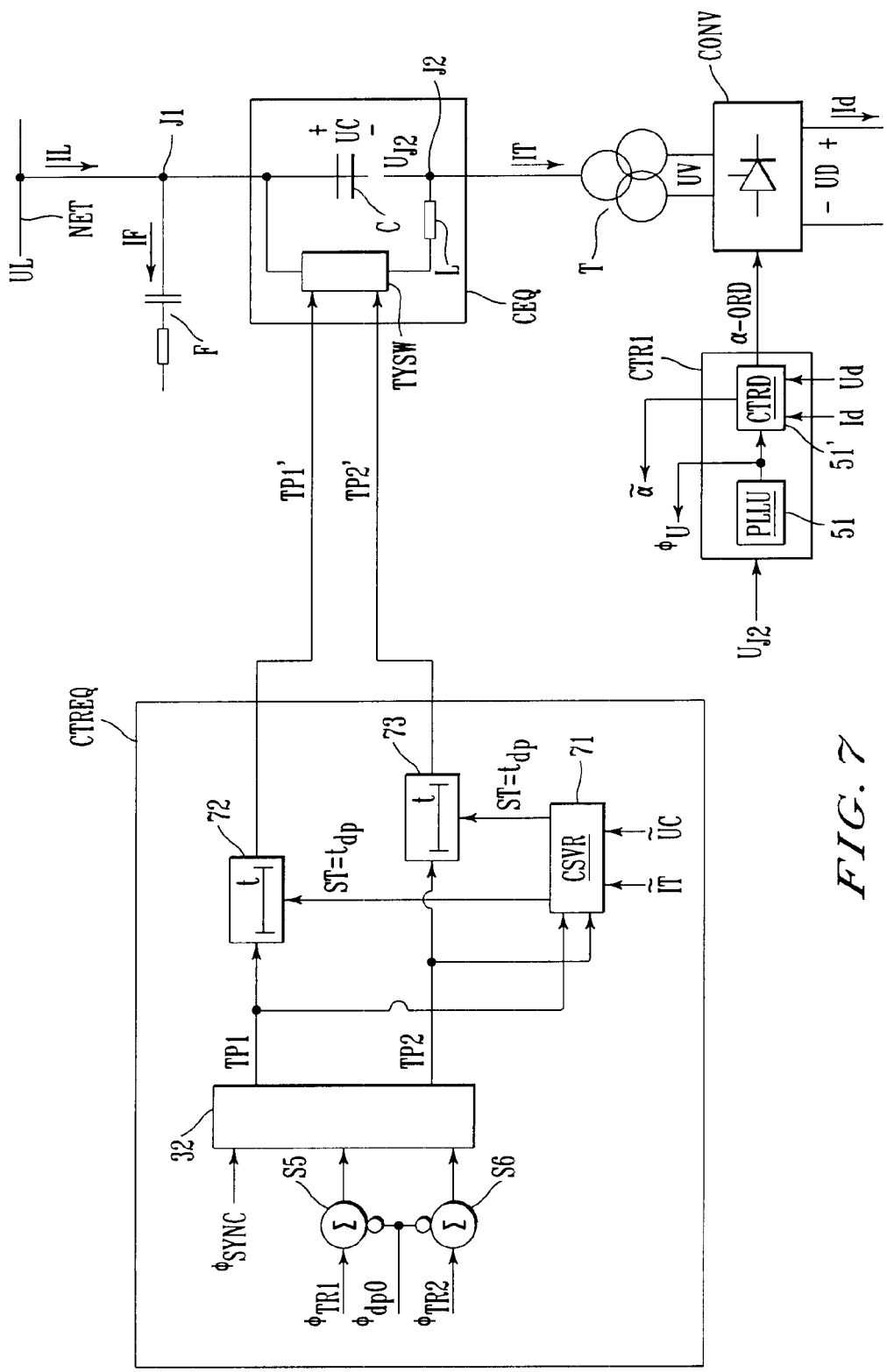
FIG. 7 shows an embodiment of a further development of the invention.

In an additional further development of the invention, especially advantageous for damping or eliminating the problem with ferroresonance mentioned by way of introduction, in particular when the current through the capacitor equipment, in addition to a fundamental component, also contains subsynchronous components, this invention is combined with a device of the kind described in patent document EP 0 689 272 A1, mentioned above and included here as a reference. FIG. 7 illustrates chematically an embodiment of this further development, here, for the sake of simplicity, of the control equipment CTREQ of the series capacitor as it is described above with reference to FIG. 5, only the trigger unit 32, the trigger signals $\Phi_{TR1}$ and $\Phi_{TR2}$ and the synchronization signal $\Phi_{SYNC}$ are shown. It is to be understood that the signals $\Phi_{TR1}$, $\Phi_{TR2}$ and $\Phi_{SYNC}$ are formed according to the invention, for example in a way described above with reference to FIG. 5.

Since the method shown in patent document EP 0 689 272 A1 presupposes that the reference pulses to the capacitor equipment occur, by a certain time designated tdp0 in this document, prior to the desired zero crossing in the capacitor voltage, the control equipment described with reference to FIG. 5 is, however, modified such that the trigger signals $\Phi_{TR1}$ and $\Phi_{TR2}$ occur earlier by a corresponding angle $\Phi_{dp0}$. This is illustrated in FIG. 7 by a summing member S5 being supplied with, and forming as an output signal, the difference of the trigger signal $\Phi_{TR1}$ and the angle $\Phi_{dp0}$ and by a summing member S6 being supplied with, and forming as an output signal, the difference of the trigger signal $\Phi_{TR2}$ and the angle $\Phi_{dp0}$.

The output signals from the summing members S5 and S6, respectively, are supplied to the trigger unit 32. The angle $\Phi_{dp0}$ is thus here equal to $2\pi f^* tdp0$, where $f$ is the fundamental frequency of the ac network NET.

Each of the firing pulses TP1 and TP2, which are thus formed with a frequency corresponding to the fundamental frequency of the ac network, is supplied to a calculating member 71 comprised in the control equipment. This calculating member is adapted, in a manner described in patent document EP 0 689 272 A1, in dependence on measured values IT of the current IT through the series capacitor equipment (se FIG. 7) and UC of the capacitor voltage, respectively, in a manner similar to that described in EP 0 689 272 A1, to form an influencing signal ST corresponding to the time delay tdp illustrated with reference to FIG. 8 of EP 0 689 272 A1. The formation of the influencing signal is initiated by the firing pulses TP1 and TP2.

The firing pulses TP1 formed by the trigger unit 32 are supplied to a delay member 72, and the firing pulses TP2 formed by the trigger unit 32 are supplied to a delay member 73. The influencing signal ST is supplied to each of the delay members, the time delay of which, t, may be influenced in dependence on the influencing signal. The output signals TP1' and TP2' from the delay members are supplied to the controllable semiconductor valve TYSW to bring the thyristor TY1 and the thyristor TY2, respectively, into the conducting state. The output signals from the delay members, which output signals are formed in the manner described, correspond to the firing pulses TP1 and TP2, respectively, delayed by the time delay tdp. Subsynchronous resonant oscillations will thereby, in a manner described in patent document EP 0 689 272 A1, be damped or completely prevented independently of a superordinate control of the effective impedance of the series capacitor at the fundamental frequency.

The invention is not limited to the embodiments shown but a plurality of modifications are feasible for the invention defined by the claims.

Although not shown in any figure, one configuration which is used comprises connecting series capacitor equipment between the converter transformer and the converter, in a 12-pulse converter then in such a way that one piece of series capacitor equipment is connected to the Y-connected secondary winding of the converter transformer and one piece of equipment is connected to the Δ-connected winding of the converter transformer.

The modifications in expressions (1)–(4) which are caused by the above-mentioned modifications, as well as other modifications of the ac circuit and of conceivable approximations of the design and operating conditions of the ac circuit, are easily realized by the person skilled in the art and are within the scope of the invention defined by the claims.

Depending on the configuration of the installation, of course, the correction value XRC described with reference to FIG. 5 may be formed in dependence on a current sensed at some other connection point in the installation, which is representative of the current through the series capacitor equipment.

The series capacitor equipment may in an installation be series-connected to one or more fixed and/or connectable capacitors.

What is claimed is:

1. Control equipment for thyristor-controlled series capacitor equipment, configured for connection between an ac network and a converter, connected thereto, for conversion between alternating current and high-voltage direct current, the converter having a control device which forms a control-angle order for phase-angle control of the converter, related to a phase position for a voltage at a chosen connection point, the series capacitor equipment having a controllable semiconductor valve and the control equipment having control means which, in dependence on a synchronization signal form firing pulses for control of the semiconductor valve, wherein the control equipment comprises phase-correcting means which form the synchronization signal in dependence on a voltage-phase signal supplied thereto and containing information about the phase position of said voltage, and on a control-angle signal supplied thereto and containing information about the control angle of the converter.

2. Control equipment according to claim 1, wherein said phase-correcting means form the synchronization signal in dependence also on a dc signal supplied thereto and which contains information about the amplitude of a sensed direct current through the converter.

3. Control equipment according to claim 1, wherein the control means form the firing pulses for control of the semiconductor valve in dependence on an ac signal supplied to the control equipment and containing information about an instantaneous amplitude of a sensed alternating current which flows through the series capacitor equipment, and on an ac voltage signal, supplied to the control equipment and containing information about an instantaneous amplitude of a sensed ac voltage across the series capacitor equipment.

4. Control equipment according to claim 1, further comprising a controller configured to control a fundamental-tone reactance of the series capacitor equipment in dependence on a difference of a reference value of the fundamental-tone reactance and an actual value thereof supplied to the controller, wherein the control equipment comprises reference-value forming means forming the reference value in dependence on a dc signal supplied to the control equipment and containing information about an amplitude of a sensed direct current through the converter.

5. Control equipment according to claim 4, wherein said reference-value forming means reduce the reference value for the fundamental-tone reactance of the series capacitor equipment when the dc signal contains information that the amplitude of the direct current exceeds a predetermined value.

6. Control equipment according to claim 1, further comprising means for controlling instants in time for the semiconductor valve such that times for zero crossings of the voltage across the capacitor equipment become substantially equidistant also when the current therethrough, in addition to its fundamental component, also contains subsynchronous components.

7. An electric installation comprising a converter, connected to an ac network for conversion between alternating current and high-voltage direct current, and thyristor-controlled series capacitor equipment connected between the ac network and the converter, the converter comprising a control device which forms a control-angle order for phase-angle control of the converter, related to a phase position for a voltage at a chosen connection point, the series capacitor equipment having a controllable semiconductor valve and having control equipment with control means which, in dependence on a synchronization signal, form firing pulses for control of the semiconductor valve, wherein the control equipment for the thyristor-controlled series capacitor equipment comprises phase-correcting means which form the synchronization signal in dependence on a voltage-phase signal supplied thereto, and on a control-angle signal supplied thereto, said voltage-phase signal containing information about the phase position of the voltage at the chosen connection point, and said control-angle signal containing information about the control angle of the converter.

8. A method for control of thyristor-controlled series-capacitor equipment, intended for connection between an ac network and a converter connected thereto for conversion between alternating current and high-voltage direct current, the series capacitor equipment having a controllable semiconductor valve, whereby a control-angle order, related to a phase position for a voltage at a chosen connection point, is formed for phase-angle control of the converter, and firing pulses for control of the semiconductor valve are formed in dependence on a synchronization signal, wherein the synchronization signal is formed in dependence on a voltage-phase signal, containing information about the phase position for said voltage, and on a control-angle signal, containing information about the control angle of the converter.

9. A method according to claim 8, wherein the synchronization signal is formed in dependence also on an amplitude for a sensed direct current through the converter.

10. A method according to claim 8, wherein the firing pulses for control of the semiconductor are formed in dependence on an instantaneous amplitude for a sensed alternating current flowing through the series capacitor equipment, and on an instantaneous amplitude for a sensed ac voltage across the series capacitor equipment.

11. A method according to claim 8, wherein the firing pulses for control of the semiconductor valve are formed in dependence also on a difference of a reference value for a fundamental-tone reactance of the series capacitor equipment and an actual value thereof, whereby said reference value is formed in dependence on an amplitude of a sensed direct current through the converter.

12. A method according to claim 11, wherein said reference value for the fundamental-tone reactance of the series capacitor equipment is reduced when the amplitude of said direct current exceeds a predetermined value.

13. A method according to claim 8, wherein instants in time for the semiconductor valve are controlled such that times for zero crossings of the voltage across the capacitor equipment become substantially equidistant also when the current therethrough, in addition to its fundamental component, also contains subsynchronous components.

* * * * *